United States Patent [19]

Tsuji

[11] 4,368,954

[45] Jan. 18, 1983

[54] COMPACT ZOOM OBJECTIVE

[75] Inventor: Sadahiko Tsuji, Yokohama, Japan

[73] Assignee: Canon Kabushiki Kaisha, Tokyo, Japan

[21] Appl. No.: 155,171

[22] Filed: Jun. 2, 1980

[30] Foreign Application Priority Data

Jun. 4, 1979 [JP] Japan .................... 54-69616

[51] Int. Cl.³ .............................................. G02B 15/18
[52] U.S. Cl. .................................................. 350/427
[58] Field of Search ............................... 350/427, 428

[56] References Cited

U.S. PATENT DOCUMENTS

| | | | |
|---|---|---|---|
| 4,017,161 | 4/1977 | Tsuji | 350/427 |
| 4,113,355 | 9/1978 | Tsuji et al. | 350/428 |
| 4,278,331 | 7/1981 | Tanaka | 350/427 |

Primary Examiner—John K. Corbin
Assistant Examiner—Rebecca D. Gass
Attorney, Agent, or Firm—Toren, McGeady and Stanger

[57] ABSTRACT

The compact zoom objective disclosed includes, from front to rear, a first lens group having positive power, a second lens group of negative power, a third lens group of positive power for collimating incident rays of light, and a fourth lens group of positive power. The fourth lens group is composed of a positive first lens of convex forward surface, a negative second lens of concave forward surface, a positive third lens, a biconvex and a positive fourth lens, and a negative fifth lens of concave forward surface arranged in this order from the front, and being characterized by fulfilling the following conditions:

(1) $0.75 F_{IV} < r_{15} < 0.95 F_{IV}$
(2) $0.85 F_{IV} < |r_{17}| < 1.2 F_{IV}$, $r_{17} < 0$
(3) $2 F_{IV} < |r_{22}| < 3.5 F_{IV}$, $r_{22} < 0$
(4) $0.8 F_{IV} < |r_{23}| < 1 F_{IV}$, $r_{23} < 0$
(5) $20 < \nu_{18} < 30$
(6) $20 < \nu_{24} < 30$ where $F_{IV}$ is the focal length of the fourth lens group; $r_{15}$ and $r_{17}$ are the radii of curvature of the front surfaces of the 1st and 2nd lenses respectively; $r_{22}$ is the radius of curvature of the rear surface of the 4th lens; $r_{23}$ is the radius of curvature of the front surface of the 5th lens; $\nu_{18}$ and $\nu_{24}$ are the Abbe numbers of the 2nd and 5th lenses respectively.

6 Claims, 32 Drawing Figures

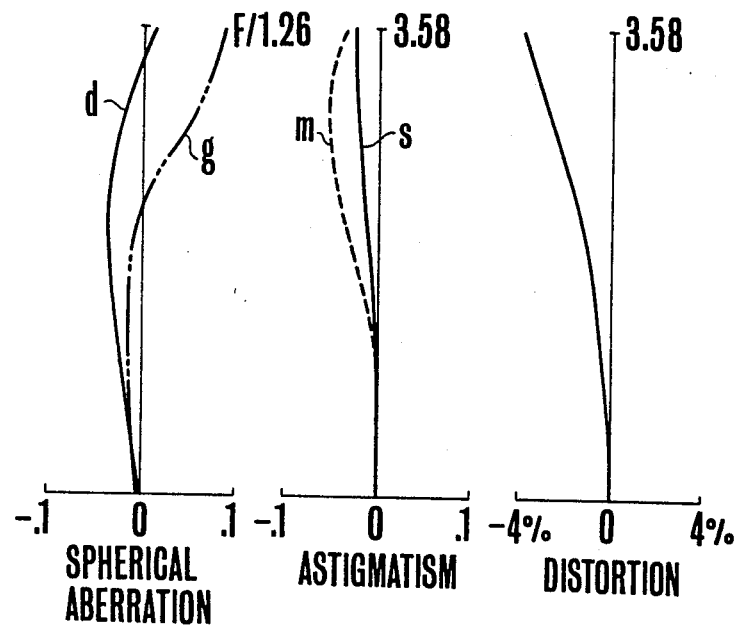
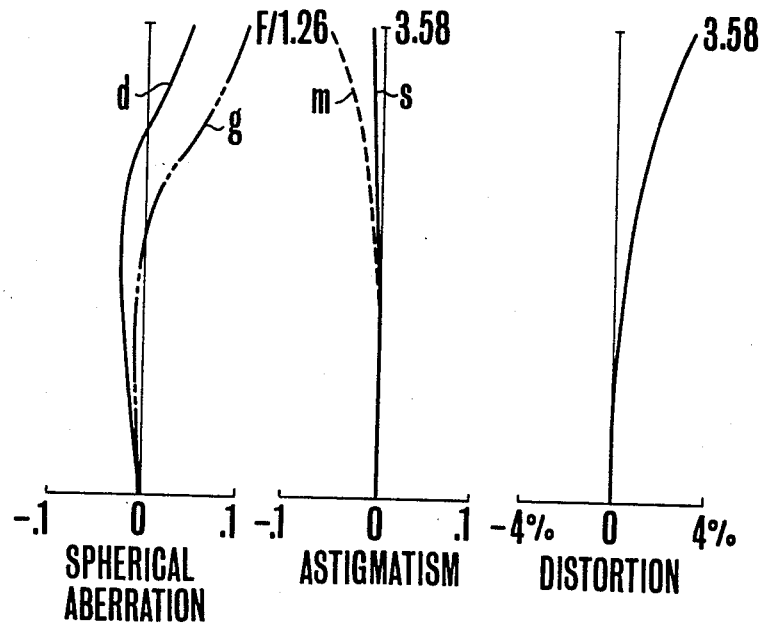

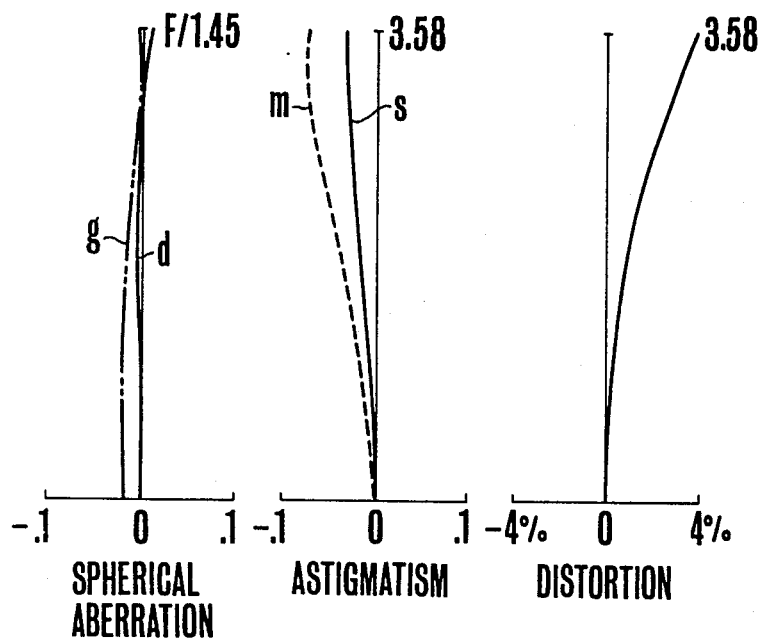
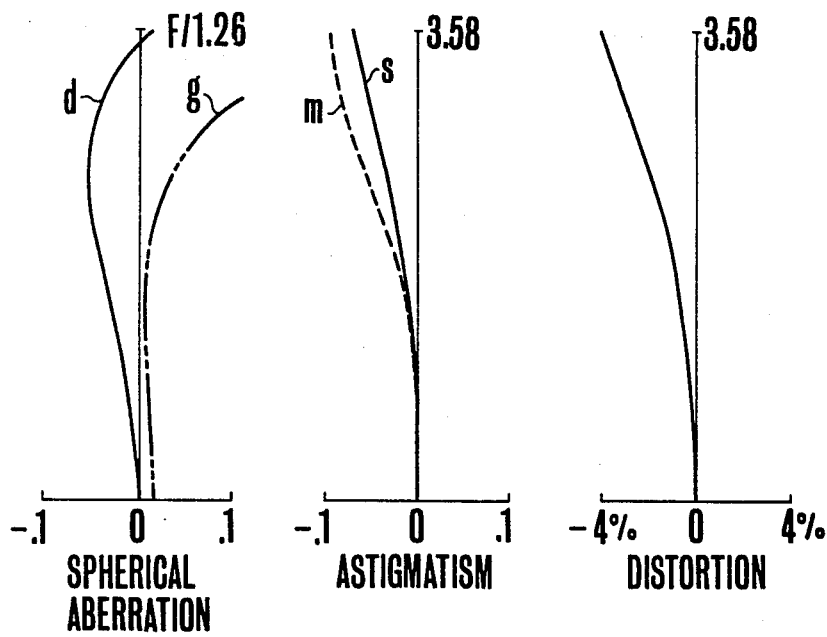

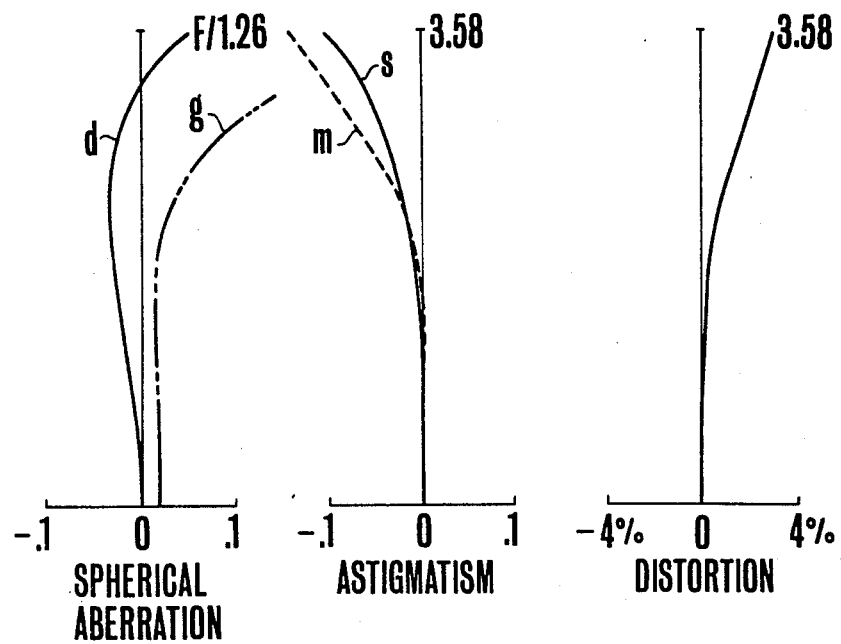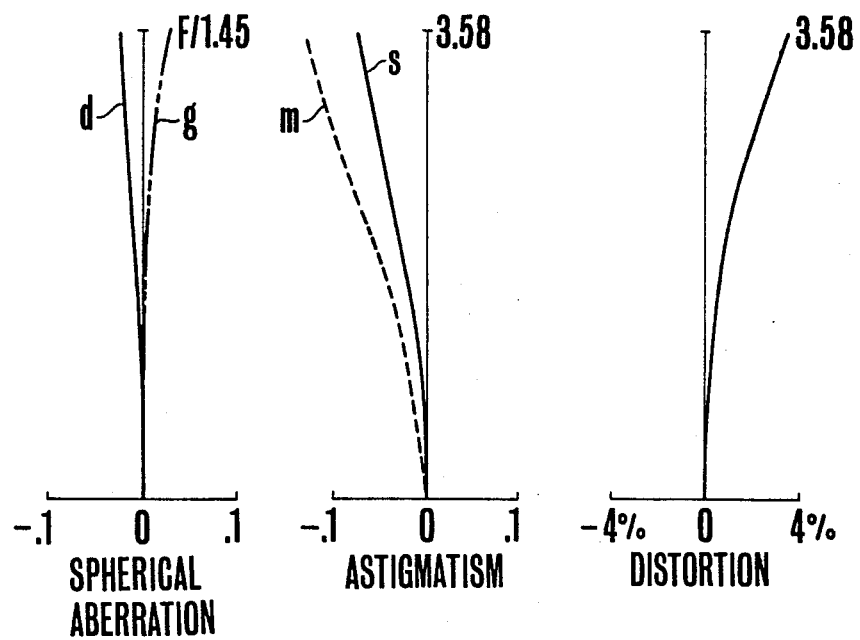

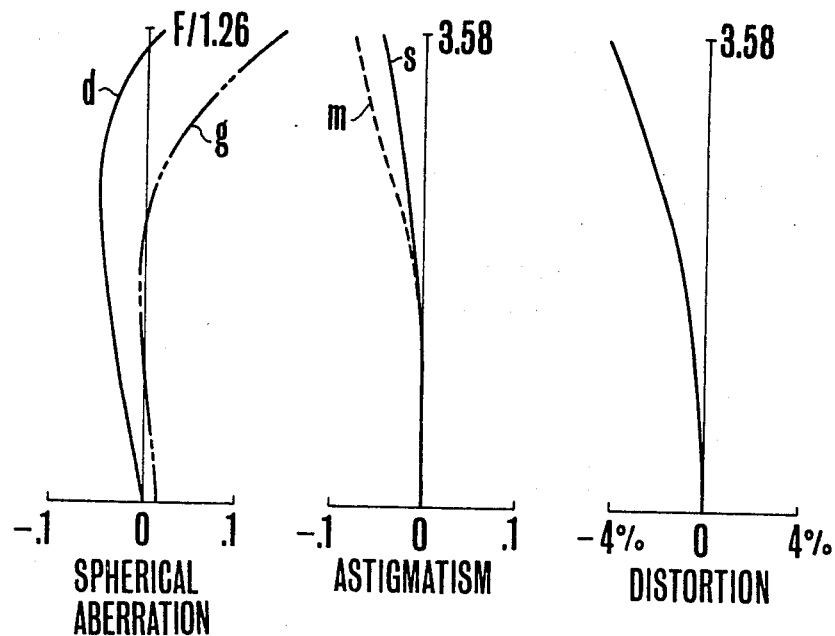
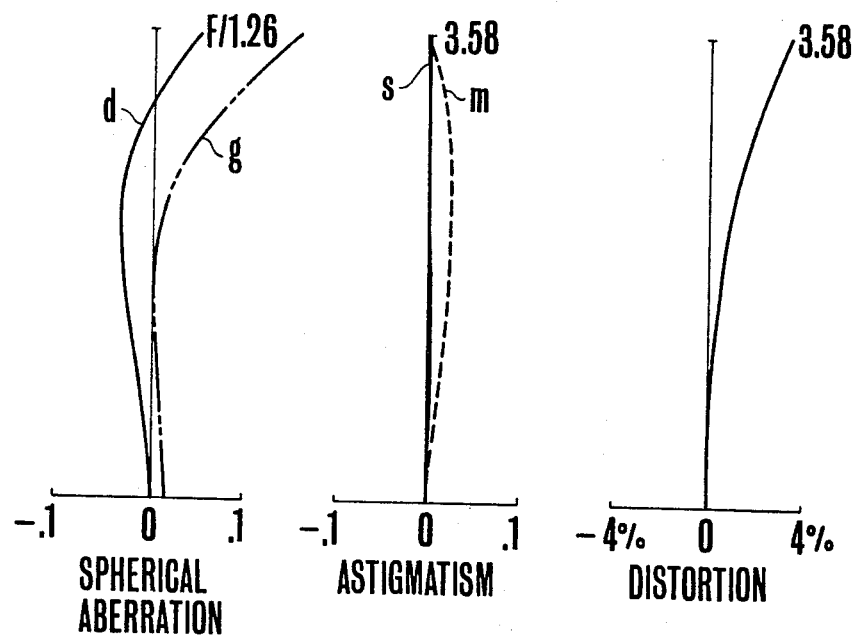

SPHERICAL ABERRATION     ASTIGMATISM     DISTORTION

COMPACT ZOOM OBJECTIVE

BACKGROUND OF THE INVENTION

This invention relates to zoom lenses for cine cameras, and more particularly to improvements over applicant's prior U.S. Pat. No. 4,017,161.

The above-identified patent describes a compact zoom lens having a zoom ratio in order of 1:5 with an F-number (aperture ratio) of 1:1.4. For a faster zoom lens having the same order of zoom ratio, a decrease in F-number down to 1:1.2 increases the various aberrations. To avoid this, it is necessary to increase the lens physical length. On the other hand, the majority of users strongly demand minimization of the bulk and size of zoom lenses. Therefore, without causing the physical length to be increased the lens' F -number must be decreased. This leads to deterioration of its spherical aberration and longitudinal and lateral chromatic aberrations. Therefore, the present invention should correct these aberrations by imparting modifications into the lenses of the fourth group or relay lens in the zoom lens described in the above-identified patent.

SUMMARY OF THE INVENTION

A first object of the present invention is to provide a faster zoom lens.

A second object is to increase the compactness of a zoom lens.

A third object is to achieve a good correction of the various aberrations.

To this end, a zoom lens comprises, from front to rear, a first group having positive power, a second group having negative power, a third group having positive power and a fourth group having positive power, the fourth group consisting of positive, negative, positive, positive and negative lenses in order from the front, and fulfilling the following conditions:

(1) $0.75F_{IV} < r_{15} < 0.95F_{IV}$
(2) $0.85F_{IV} < |r_{17}| < 1.2F_{IV}$, $r_{17} < 0$
(3) $2F_{IV} < |r_{22}| < 3.5F_{IV}$, $r_{22} < 0$
(4) $0.8F_{IV} < |r_{23}| < 1F_{IV}$, $r_{23} < 0$
(5) $20 < \nu_{18} < 30$
(6) $20 < \nu_{24} < 30$ where $F_{IV}$ is the focal length of the fourth lens group; $R_{15}$ is the radius of curvature of the front surface of the positive 1st lens; $r_{17}$ is the radius of curvature of the front surface of the negative 2nd lens; $r_{22}$ is the radius of curvature of the rear surface of the positive 4th lens; $r_{23}$ is the radius of curvature of the front surface of the negative 5th lens; $\nu_{18}$ is the Abbe number of the negative 2nd lens; and $\nu_{24}$ is the Abbe number of the negative 5th lens.

BRIEF DESCRIPTION OF THE DRAWINGS

FIGS. 6A, 6B and 6C are graphic representations of the aberrations of the FIG. 1 lens when in wide angle.

FIGS. 7A, 7B and 7C are similar graphs when in middle angle.

FIGS. 8A, 8B and 8C are similar graphs when in telephoto side.

FIGS. 9A, 9B and 9C are graphic representations of the aberrations of the zoom lens of FIG. 2 when in wide angle.

FIGS. 10A, 10B and 10C are similar graphs when in middle angle.

FIGS. 11A, 11B and 11C are similar graphs when in telephoto side.

FIGS. 12A, 12B and 12C are graphic representations of the aberrations of the zoom lens of FIG. 3, when in wide angle.

FIGS. 13A, 13B, 13C are similar graphs when in middle angle.

DESCRIPTION OF THE PREFERRED EMBODIMENTS

Figure 1:
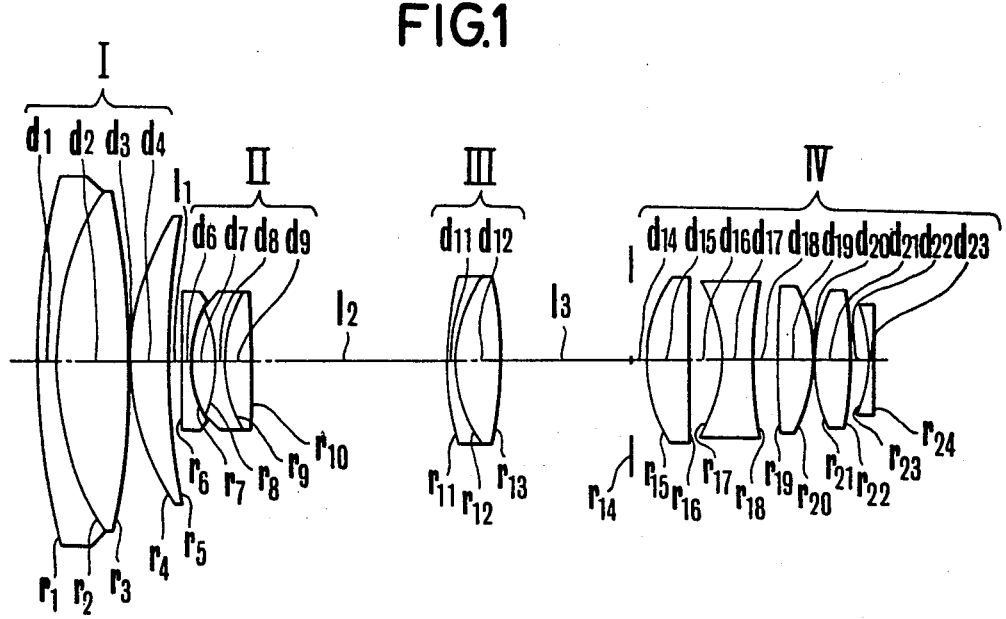
FIG. 1 is a block diagram of a first embodiment of a zoom lens according to the present invention.

Examples of specific zoom lenses are described in connection with FIGS. 1 to 3. The zoom lens of the present invention fulfills the following general requirements for configuration of the lenses in each group. The first group I consists of a positive doublet composed of a negative meniscus lens and a bi-convex lens cemented together, and a positive meniscus singlet of convex forward object. The second group II consists of a negative singlet of concave rear object and a positive doublet composed of a bi-concave lens and a positive lens cemented together. The third group III consists of a positive doublet composed of a negative meniscus lens and a bi-convex lens arranged either in this order from the front, or in the reverse order. The fourth group IV consists of a positive meniscus lens with its front surface strongly convex toward the front, a bi-concave lens, a bi-convex lens with its rear surface strongly convex toward the rear, a bi-convex lens with its front surface strongly convex toward the front, and a negative meniscus lens of concave forward object.

The previously upper and lower limits apply to the above structure and have the following significance. In general it is the method of weakening radii of curvature that is employed in achieving an increase of the relative aperture while the total number of lens components remains unchanged. It is particularly effective to select the lens surface $R_{17}$, at which the height of incidence of axial rays, for weakening the radius of curvature. On the other hand, however, it is desirable from the standpoint of the compactness to make this surface strong. If the upper limit of condition (1) is exceeded, compactness becomes difficult. When the lower limit is exceeded, the spherical aberration becomes difficult to correct. Condition (2) is a condition for correction of third order spherical aberration. That is, when the upper limit is exceeded, the spherical aberration is entirely under-corrected so that use is impossible at as large an aperture as F/1.2. When the lower limit is exceeded, an over-correction will result and the flare becomes unacceptable. Conditions (3) and (4) are primary requisite for achieving a great increase in the relative aperture with the total number of lens components limited to a minimum. That is, imparting a strong converging action into the lens surface $r_{24}$ at which the height of incidence of axial rays is high, and giving a relatively small radius of curvature to the lens surface $r_{25}$ at which the height of incidence is low, produce higher-order spherical aberrations with over-correction of the zonal spherical aberration and with under-correction of marginal spherical aberration. This makes it possible to minimize the amount of spherical aberration despite the fact that the relative aperture is increased to as high as F/1.2. When the upper limit of condition (3) is exceeded, the spherical aberration is over-corrected. When the lower limit is exceeded, it is under-corrected. When the upper limit of condition (4) is exceeded, the spherical aberration is under-corrected. When the lower limit is exceeded, it is over-corrected. Condition (5) is a condition for correction of longitudinal chromatic aberration. When the upper limit is exceeded, under-correction will result. On the other hand, the lower limit represents a range of glass materials available at the present time. Condition (6) is a condition mainly for correcting lateral chromatic aberration. When the upper limit is exceeded, under-correction will result. On the other hand, the lower limit represents a range of glass materials available at the present time.

It will be appreciated from the above that the present invention provides a zoom lens of as high a relative aperture as F/1.2 and limits the number of lens components to a minimum while nevertheless preserving good optical performance.

Figure 4:
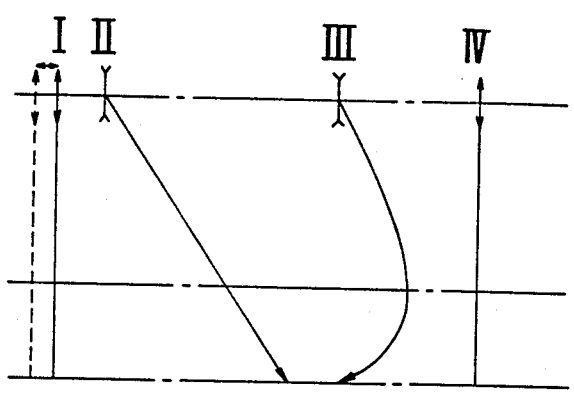
FIGS. 4 and 5 are graphs showing the traces of moving lens groups during zooming.
Figure 5:
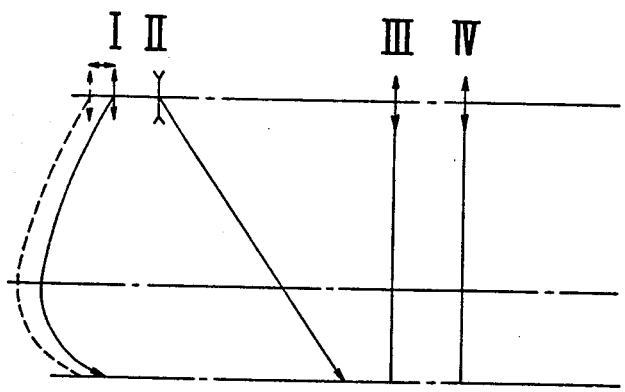

It should be pointed out in connection with the above-described arrangement that the first, second and third groups constitute a substantially afocal zoom system. This system may operate in either of the manners shown in FIGS. 4 and 5 to effect focusing and zooming. In FIG. 4, the first group I focuses on differing object distances, the second group II is axially movable along the path of the trace shown to vary the focal length, and the third group III is axially movable simultaneously with the second group II to compensate for the image shift, that is, to maintain a constant image plane. This scheme holds in Examples 1 and 2. In FIG. 5, focusing and zooming are performed as follows. The second group II is axially movable along the path of the trace shown to vary focal length of the entire system. The first group I is axially movable along the path of trace depicted by either a solid or a dashed line to compensate for the image shift and also has a focusing function for suiting differing object distances. The third group III remains stationary and serves for collimating the exiting rays of light. This scheme holds in Example 3.

Figure 2:
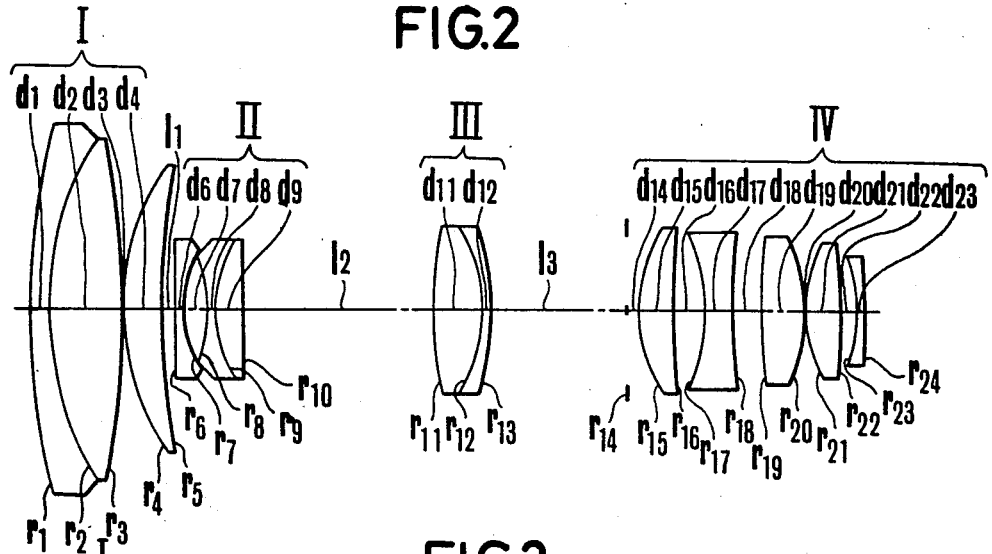
FIG. 2 is a similar diagram of a second embodiment of the invention.
Figure 3:
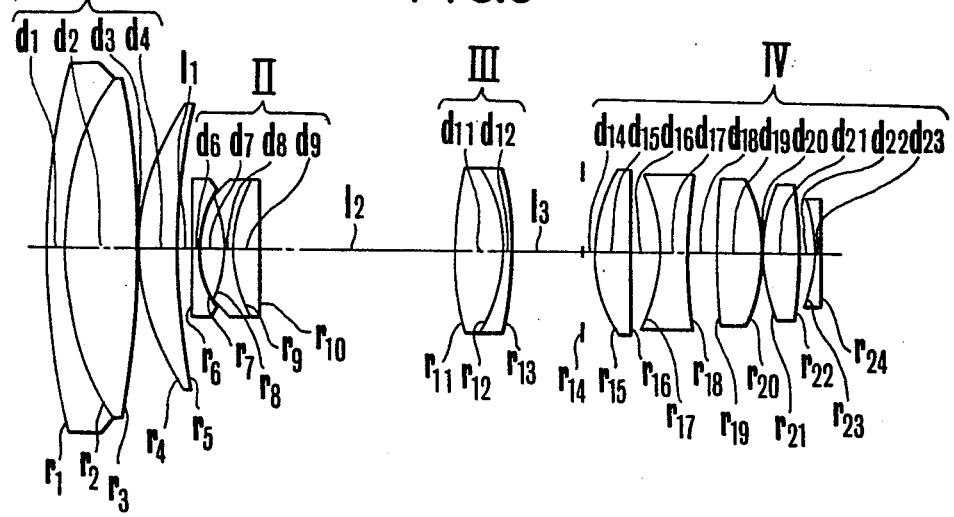
FIG. 3 is a similar diagram of a third embodiment of the invention.

The following shows numerical data in accordance with which the specific zoom lenses shown in FIGS. 1 to 3 can be constructed for the radius of curvature of the i-th lens surface, $r_i$, the i-th axial separation, $d_i$, between the successive lens surfaces, the refractive index of the medium of the i-th lens, $n_i$, the Abbe number of the medium of the i-th lens, $\nu_i$, the i-th variable air separation, $l_i$, and the focal lengths $F_I$, $F_{II}$, $F_{III}$ and $F_{IV}$ of the first, second, third and fourth lens groups respectively.

EXAMPLE 1 f = 9.228–43.805 F.No. 1:1.26–1.45
Diaphragm at 14th Surface

| | | | | | | |
|---|---|---|---|---|---|---|
| $r_1$ = | 84.146 | $d_1$ = 2.0 | $n_1$ = 1.0 | | | |
| $r_2$ = | 35.583 | $d_2$ = 7.87 | $n_2$ = 1.80518 | $\nu_2$ = 25.4 | | |
| $r_3$ = | −103.996 | $d_3$ = 0.1 | $n_3$ = 1.58913 | $\nu_3$ = 61.1 | | |
| $r_4$ = | 27.917 | $d_4$ = 4.07 | $n_4$ = 1.0 | | | |
| $r_5$ = | 95.165 | $d_5$ = $l_1$ | $n_5$ = 1.58913 | $\nu_5$ = 61.1 | | |
| $r_6$ = | 363.049 | $d_6$ = 0.9 | $n_6$ = 1.0 | | | |
| $r_7$ = | 12.195 | $d_7$ = 2.61 | $n_7$ = 1.69350 | $\nu_7$ = 53.2 | | |
| $r_8$ = | −16.671 | $d_8$ = 0.9 | $n_8$ = 1.0 | | | |
| $r_9$ = | 13.785 | $d_9$ = 2.79 | $n_9$ = 1.69350 | $\nu_9$ = 53.2 | | |
| $r_{10}$ = | −7680.848 | $d_{10}$ = $l_2$ | $n_{10}$ = 1.80518 | $\nu_{10}$ = 25.4 | | |
| $r_{11}$ = | 34.169 | $d_{11}$ = 0.9 | $n_{11}$ = 1.0 | | | |
| $r_{12}$ = | 16.119 | $d_{12}$ = 4.82 | $n_{12}$ = 1.80518 | $\nu_{12}$ = 25.4 | | |
| $r_{13}$ = | −52.155 | $d_{13}$ = $l_3$ | $n_{13}$ = 1.62374 | $\nu_{13}$ = 47.1 | | |
| $r_{14}$ = | Diaphragm | $d_{14}$ = 1.68 | $n_{14}$ = 1.0 | | | |
| $r_{15}$ = | 16.283 | $d_{15}$ = 4.35 | $n_{15}$ = 1.0 | | | |
| $r_{16}$ = | 214.442 | $d_{16}$ = 3.63 | $n_{16}$ = 1.6968 | $\nu_{16}$ = 55.5 | | |
| $r_{17}$ = | −18.519 | $d_{17}$ = 3.14 | $n_{17}$ = 1.0 | | | |
| $r_{18}$ = | 46.639 | $d_{18}$ = 2.67 | $n_{18}$ = 1.7552 | $\nu_{18}$ = 27.5 | | |
| $r_{19}$ = | 103.505 | $d_{19}$ = 3.63 | $n_{19}$ = 1.0 | | | |
| $r_{20}$ = | −18.965 | $d_{20}$ = 0.54 | $n_{20}$ = 1.65844 | $\nu_{20}$ = 50.9 | | |
| $r_{21}$ = | 18.834 | $d_{21}$ = 3.7 | $n_{21}$ = 1.0 | | | |
| $r_{22}$ = | −47.131 | $d_{22}$ = 1.78 | $n_{22}$ = 1.883 | $\nu_{22}$ = 40.8 | | |
| $r_{23}$ = | −18.952 | $d_{23}$ = 0.8 | $n_{23}$ = 1.0 | | | |
| $r_{24}$ = | 1068.979 | | $n_{24}$ = 1.92286 | $\nu_{24}$ = 20.9 | | |
| | | | $n_{25}$ = 1.0 | | | |

$F_I$ = 41.645
$F_{II}$ = −10.801
$F_{III}$ = 41.986
$F_{IV}$ = 20.291

| f | 9.228 | 20.090 | 43.805 |
|---|---|---|---|
| $l_1$ | 1.495 | 14.229 | 20.085 |
| $l_2$ | 21.057 | 15.225 | 2.495 |
| $l_3$ | 14.215 | 7.313 | 14.187 |

$r_{15} = 0.802 F_{IV}$
$|r_{17}| = 0.913 F_{IV}$
$|r_{22}| = 2.323 F_{IV}$
$|r_{23}| = 0.934 F_{IV}$
$\nu_{18} = 27.5$
$\nu_{24} = 20.9$

EXAMPLE 2 f = 9.228–43.805 F.No.1:1.26–1.45 Diaphragm at 14th Surface

| | | | | | | |
|---|---|---|---|---|---|---|
| $r_1$ = | 84.146 | $d_1$ = 2.0 | $n_1$ = 1.0 | | | |
| $r_2$ = | 35.583 | $d_2$ = 7.87 | $n_2$ = 1.80518 | $\nu_2$ = 25.4 | | |
| $r_3$ = | −103.996 | $d_3$ = 0.1 | $n_3$ = 1.58913 | $\nu_3$ = 61.1 | | |
| $r_4$ = | 27.917 | $d_4$ = 4.07 | $n_4$ = 1.0 | | | |
| $r_5$ = | 95.165 | $d_5$ = $l_1$ | $n_5$ = 1.58913 | $\nu_5$ = 61.1 | | |
| $r_6$ = | 363.049 | $d_6$ = 0.9 | $n_6$ = 1.0 | | | |
| $r_7$ = | 12.195 | $d_7$ = 2.61 | $n_7$ = 1.69350 | $\nu_7$ = 53.2 | | |
| $r_8$ = | −16.671 | $d_8$ = 0.9 | $n_8$ = 1.0 | | | |
| $r_9$ = | 13.785 | $d_9$ = 2.79 | $n_9$ = 1.69350 | $\nu_9$ = 53.2 | | |
| $r_{10}$ = | −7680.848 | $d_{10}$ = $l_2$ | $n_{10}$ = 1.80518 | $\nu_{10}$ = 25.4 | | |
| $r_{11}$ = | 47.713 | $d_{11}$ = 5.14 | $n_{11}$ = 1.0 | | | |
| $r_{12}$ = | −16.242 | $d_{12}$ = 0.9 | $n_{12}$ = 1.62374 | $\nu_{12}$ = 47.1 | | |
| $r_{13}$ = | −35.945 | $d_{13}$ = $l_3$ | $n_{13}$ = 1.80518 | $\nu_{13}$ = 25.4 | | |
| $r_{14}$ = | Diaphragm | $d_{14}$ = 1.68 | $n_{14}$ = 1.0 | | | |
| $r_{15}$ = | 17.896 | $d_{15}$ = 3.85 | $n_{15}$ = 1.0 | | | |
| $r_{16}$ = | 176.591 | $d_{16}$ = 3.22 | $n_{16}$ = 1.834 | $\nu_{16}$ = 37.2 | | |
| $r_{17}$ = | −23.005 | $d_{17}$ = 3.01 | $n_{17}$ = 1.0 | | | |
| $r_{18}$ = | 74.537 | $d_{18}$ = 3.08 | $n_{18}$ = 1.92286 | $\nu_{18}$ = 20.9 | | |
| $r_{19}$ = | 100.572 | $d_{19}$ = 4.52 | $n_{19}$ = 1.0 | | | |
| $r_{20}$ = | −19.100 | $d_{20}$ = 0.21 | $n_{20}$ = 1.65844 | $\nu_{20}$ = 50.9 | | |
| $r_{21}$ = | 18.186 | $d_{21}$ = 3.77 | $n_{21}$ = 1.0 | | | |
| $r_{22}$ = | −58.998 | $d_{22}$ = 1.75 | $n_{22}$ = 1.67000 | $\nu_{22}$ = 57.4 | | |
| $r_{23}$ = | −17.527 | $d_{23}$ = 0.8 | $n_{23}$ = 1.0 | | | |
| $r_{24}$ = | −75.122 | | $n_{24}$ = 1.7552 | $\nu_{24}$ = 27.5 | | |
| | | | $n_{25}$ = 1.0 | | | |

$F_I$ = 41.645
$F_{II}$ = −10.801
$F_{III}$ = 41.999
$F_{IV}$ = 20.292

| f | 9.228 | 20.091 | 43.805 |
|---|---|---|---|
| $l_1$ | 1.495 | 14.229 | 20.085 |
| $l_2$ | 20.591 | 14.760 | 2.029 |
| $l_3$ | 14.215 | 7.313 | 14.187 |

$r_{15} = 0.882 F_{IV}$
$|r_{17}| = 1.134 F_{IV}$
$|r_{22}| = 2.908 F_{IV}$
$|r_{23}| = 0.864 F_{IV}$
$\nu_{18} = 20.9$
$\nu_{24} = 27.5$

EXAMPLE 3

| f = 9.228–43.839 F.No.1:1.26–1.45 Diaphragm at 14th Surface | | | | | |
|---|---|---|---|---|---|
| $r_1 =$ | 84.146 | $d_1 = 2.0$ | $n_1 = 1.0$ | | |
| $r_2 =$ | 35.583 | $d_2 = 7.87$ | $n_2 = 1.80518$ | $v_2 = 25.4$ | |
| $r_3 =$ | −103.996 | $d_3 = 0.1$ | $n_3 = 1.58913$ | $v_3 = 61.1$ | |
| $r_4 =$ | 27.917 | $d_4 = 4.07$ | $n_4 = 1.0$ | | |
| $r_5 =$ | 95.165 | $d_5 = l_1$ | $n_5 = 1.58913$ | $v_5 = 61.1$ | |
| $r_6 =$ | 363.049 | $d_6 = 0.9$ | $n_6 = 1.0$ | | |
| $r_7 =$ | 12.195 | $d_7 = 2.61$ | $n_7 = 1.69350$ | $v_7 = 53.2$ | |
| $r_8 =$ | −16.671 | $d_8 = 0.9$ | $n_8 = 1.0$ | | |
| $r_9 =$ | 13.785 | $d_9 = 2.79$ | $n_9 = 1.69350$ | $v_9 = 53.2$ | |
| $r_{10} =$ | −7680.848 | $d_{10} = l_2$ | $n_{10} = 1.80518$ | $v_{10} = 25.4$ | |
| $r_{11} =$ | 40.338 | $d_{11} = 5.19$ | $n_{11} = 1.0$ | | |
| $r_{12} =$ | −18.085 | $d_{12} = 0.9$ | $n_{12} = 1.62374$ | $v_{12} = 47.1$ | |
| $r_{13} =$ | −42.664 | $d_{13} = l_3$ | $n_{13} = 1.80518$ | $v_{13} = 25.4$ | |
| $r_{14} =$ | Diaphragm | $d_{14} = 1.68$ | $n_{14} = 1.0$ | | |
| $r_{15} =$ | 17.194 | $d_{15} = 3.77$ | $n_{15} = 1.0$ | | |
| $r_{16} =$ | 198.428 | $d_{16} = 3.27$ | $n_{16} = 1.7725$ | $v_{16} = 49.6$ | |
| $r_{17} =$ | −20.139 | $d_{17} = 3.01$ | $n_{17} = 1.0$ | | |
| $r_{18} =$ | 68.329 | $d_{18} = 3.11$ | $n_{18} = 1.80518$ | $v_{18} = 25.4$ | |
| $r_{19} =$ | 100.766 | $d_{19} = 4.56$ | $n_{19} = 1.0$ | | |
| $r_{20} =$ | −19.422 | $d_{20} = 0.21$ | $n_{20} = 1.65844$ | $v_{20} = 50.9$ | |
| $r_{21} =$ | 18.996 | $d_{21} = 3.68$ | $n_{21} = 1.0$ | | |
| $r_{22} =$ | −50.617 | $d_{22} = 1.81$ | $n_{22} = 1.7725$ | $v_{22} = 49.6$ | |
| $r_{23} =$ | 17.626 | $d_{23} = 0.8$ | $n_{23} = 1.0$ | | |
| $r_{24} =$ | 181.929 | | $n_{24} = 1.84666$ | $v_{24} = 23.9$ | |
| | | | $n_{25} = 1.0$ | | |

$F_I = 41.645$
$F_{II} = 10.801$
$F_{III} = 41.999$
$F_{IV} = 20.292$

| f | 9.228 | 20.111 | 43.839 |
|---|---|---|---|
| $l_1$ | 1.495 | 14.240 | 20.089 |
| $l_2$ | 20.976 | 15.134 | 2.396 |
| $l_3$ | 7.32 | 7.32 | 7.32 |

$r_{15} = 0.847 F_{IV}$
$|r_{17}| = 0.992 F_{IV}$
$|r_{22}| = 2.494 F_{IV}$
$|r_{23}| = 0.869 F_{IV}$
$v_{18} = 25.4$
$v_{24} = 23.9$

Figure 14A:
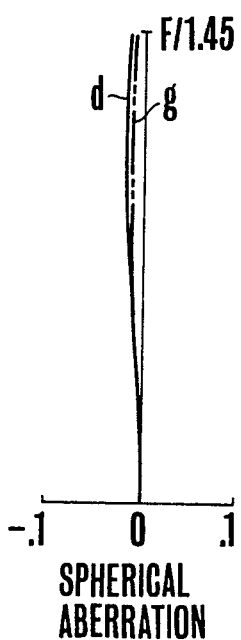
FIGS. 14A, 14B and 14C are similar graphs when in telephoto side.
Figure 14B:
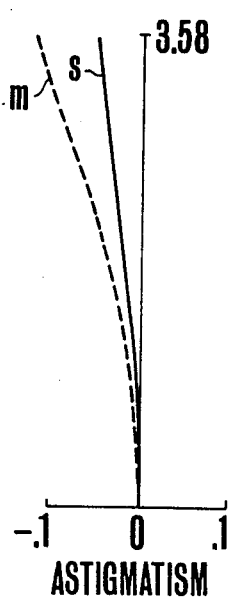
Figure 14C:
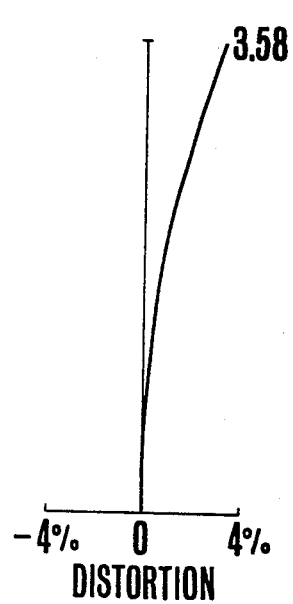

The spherical aberration, astigmatism and distortion of Example 1 zoom lens in the shortest, intermediate and longest focal length positions are shown in FIGS. 6, 7 and 8 respectively. The various aberrations of Example 2 zoom lens in the shortest, intermediate and longest focal length positions are shown in FIGS. 9, 10 and 11 respectively. The various aberrations of Example 3 zoom lens in the shortest, intermediate and longest focal length positions are shown in FIGS. 12, 13 and 14, respectively.

Since the first, second and third lens groups constitute a substantially afocal system, a spot mirror, or half-transparent mirror, or a light splitting prism may be arranged in a space between the third and fourth lens groups so that a portion of the light beam entering the beam-splitter is directed to a finder optical system.

It is noted that in the above-described examples of numerical data, use is made of the construction of the applicant's prior art in the first and second lens group without further alteration. In this case, the F-number in the telephoto position becomes slower because of the limitation of the rearmost surface of the second lens group. But if the design is initiated from the start, it is of course possible to ensure the F-number 1:1.2 throughout the zooming range.

What is claimed is:

1. A compact zoom lens comprising:
   a movable first lens group having a positive power;
   a movable second lens group having a negative power and arranged to the rear of said first lens group;
   a third lens group having a positive power and arranged to the rear of said second lens group; and
   a fixed fourth lens group for image formation having a negative power and arranged to the rear of said third lens group,
   said fourth lens group consisting of a positive first lens of convex forward surface counting from the front, negative second lens of concave forward surface, a positive third lens, a biconvex positive fourth lens, and a negative fifth lens of concave forward surface and satisfying the following conditions:
   (1) $0.75 F_{IV} < r_{15} < 0.95 F_{IV}$
   (2) $0.85 F_{IV} < |r_{17}| < 1.2 F_{IV}, r_{17} < 0$
   (3) $2 F_{IV} < |r_{22}| < 3.5 F_{IV}, r_{22} < 0$
   (4) $0.8 F_{IV} < |r_{23}| < 1 F_{IV}, r_{23} < 0$
   (5) $20 < v_{18} 21\ 30$
   (6) $20 < v_{24} < 30$ where $F_{IV}$ is the focal length of the fourth lens group; $r_{15}$ is the radius of curvature of the front surface of the positive first lens; $r_{17}$ is the radius of curavature of the front surface of the negative second lens; $r_{22}$ is the radius of curvature of the rear surface of the positive fourth lens; $r_{23}$ is the radius of curavature of the front surface of the negative fifth lens; $v_{18}$ is the Abbe number of the negative second lens; and $v_{24}$ is the Abbe number of the negative fifth lens.

2. A zoom lens as described in claim 1, wherein said first lens group has a focusing function of causing difference in the object distance, said second lens group is axially movable to vary the focal length, and said third lens group is axially movable simultaneously with said second lens group to compensate for the image shift.

3. A zoom lens as described in claim 1, wherein said second lens group is axially movable to vary the focal length, said first lens group is axially movable simultaneously with said second lens group to compensate for the image shift and has a focusing function of causing difference in the object distance, and said third lens group is fixed to collimate the exiting rays of light.

4. A zoom lens as in claim 1, and having the following numerical data wherein the radius of curvature of the i-th lens surface is ri, the i-th axial separation between successive lens surfaces is di, the refractive index of the medium of the i-th lens is ni, the Abbe number of the medium of the i-th lens is $v$i, the i-th variable air separation is li, the focal lengths of the first, second, third and fourth lens groups are $F_I$, $F_{II}$, $F_{III}$, and $F_{IV}$ respectively, and i = 1, 2, 3, . . .

| Focal length f = 9.228–43.805 | | F.No. 1: 1.26–1.45 | | |
|---|---|---|---|---|
| $r[\gamma]_1 =$ | 84.146 | $d_1 = 2.0$ | $n_1 = 1.0$ | |
| $r[\gamma]_2 =$ | 35.583 | $d_2 = 7.87$ | $n_2 = 1.80518$ | $v_2 = 25.4$ |
| $r[\gamma]_3 =$ | −103.996 | $d_3 = 0.1$ | $n_3 = 1.58913$ | $v_3 = 61.1$ |
| $r[\gamma]_4 =$ | 27.917 | $d_4 = 4.07$ | $n_4 = 1.0$ | |
| $r[\gamma]_5 =$ | 95.165 | $d_5 = l_1$ | $n_5 = 1.58913$ | $v_5 = 61.1$ |
| $r[\gamma]_6 =$ | 363.049 | $d_6 = 0.9$ | $n_6 = 1.0$ | |
| $r[\gamma]_7 =$ | 12.195 | $d_7 = 2.61$ | $n_7 = 1.69350$ | $v_7 = 53.2$ |
| $r[\gamma]_8 =$ | −16.671 | $d_8 = 0.9$ | $n_8 = 1.0$ | |
| $r[\gamma]_9 =$ | 13.785 | $d_9 = 2.79$ | $n_9 = 1.69350$ | $v_9 = 53.2$ |
| $r[\gamma]_{10} =$ | −7680.848 | $d_{10} = l_2$ | $n_{10} = 1.80518$ | $v_{10} = 25.4$ |
| $r[\gamma]_{11} =$ | 34.169 | $d_{11} = 0.9$ | $n_{11} = 1.0$ | |
| $r[\gamma]_{12} =$ | 16.119 | $d_{12} = 4.82$ | $n_{12} = 1.80518$ | $v_{12} = 25.4$ |
| $r[\gamma]_{13} =$ | −52.155 | $d_{13} = l_3$ | $n_{13} = 1.62374$ | $v_{13} = 47.1$ |
| $r[\gamma]_{14} =$ | Diaphragm | $d_{14} = 1.68$ | $n_{14} = 1.0$ | |
| $r[\gamma]_{15} =$ | 16.283 | $d_{15} = 4.35$ | $n_{13} = 1.0$ | |
| $r[\gamma]_{16} =$ | 214.442 | $d_{16} = 3.63$ | $n_{16} = 1.6968$ | $v_{16} = 55.5$ |

-continued

| | | | |
|---|---|---|---|
| $r[\gamma]_{17} =$ | −18.519 | $d_{17} = 3.14$ | $n_{17} = 1.0$ |
| $r[\gamma]_{18} =$ | 46.639 | $d_{18} = 2.67$ | $n_{18} = 1.7552$ $\nu_{18} = 27.5$ |
| $r[\gamma]_{19} =$ | 103.505 | $d_{19} = 3.63$ | $n_{19} = 1.0$ |
| $r[\gamma]_{20} =$ | −18.965 | $d_{20} = 0.54$ | $n_{20} = 1.65844$ $\nu_{20} = 50.9$ |
| $r[\gamma]_{21} =$ | 18.834 | $d_{21} = 3.7$ | $n_{21} = 1.0$ |
| $r[\gamma]_{22} =$ | −47.131 | $d_{22} = 1.78$ | $n_{22} = 1.883$ $\nu_{22} = 40.8$ |
| $r[\gamma]_{23} =$ | −18.952 | $d_{23} = 0.8$ | $n_{23} = 1.0$ |
| $r[\gamma]_{24} =$ | 1068.979 | | $n_{24} = 1.92286$ $\nu_{24} = 20.9$ |
| | | | $n_{25} = 1.0$ |

| | | | |
|---|---|---|---|
| f | 9.228 | 20.090 | 43.805 |
| $l_1$ | 1.495 | 14.229 | 20.085 |
| $l_2$ | 21.057 | 15.225 | 2.495 |
| $l_3$ | 14.215 | 7.313 | 14.187 |

5. A zoom lens as in claim 1, and having the following numerical data wherein the radius of curvature of the i-th lens surface is ri, the i-th axial separation between successive lens surfaces is di, the refractive index of the medium of the i-th lens is ni, the Abbe number of the medium of the i-th lens is $\nu$i, the i-th variable air separation is li, the focal lengths of the first, second, third, and fourth lens groups are $F_I$, $F_{II}$, $F_{III}$, and $F_{IV}$ respectively and i=1, 2, 3, ...

| Focal length f = 9.228–43.805 F.No.1:1.26–1.45 | | | |
|---|---|---|---|
| $r_1 =$ | 84.146 | $d_1 = 2.0$ | $n_1 = 1.0$ |
| $r_2 =$ | 35.583 | $d_2 = 7.87$ | $n_2 = 1.80518$ $\nu_2 = 25.4$ |
| $r_3 =$ | −103.996 | $d_3 = 0.1$ | $n_3 = 1.58913$ $\nu_3 = 61.1$ |
| $r_4 =$ | 27.917 | $d_4 = 4.07$ | $n_4 = 1.0$ |
| $r_5 =$ | 95.165 | $d_5 = l_1$ | $n_5 = 1.58913$ $\nu_5 = 61.1$ |
| $r_6 =$ | 363.049 | $d_6 = 0.9$ | $n_6 = 1.0$ |
| $r_7 =$ | 12.195 | $d_7 = 2.61$ | $n_7 = 1.69350$ $\nu_7 = 53.2$ |
| $r_8 =$ | −16.671 | $d_8 = 0.9$ | $n_8 = 1.0$ |
| $r_9 =$ | 13.785 | $d_9 = 2.79$ | $n_9 = 1.69350$ $\nu_9 = 53.2$ |
| $r_{10} =$ | −7680.848 | $d_{10} = l_2$ | $n_{10} = 1.80518$ $\nu_{10} = 25.4$ |
| $r_{11} =$ | 47.713 | $d_{11} = 5.14$ | $n_{11} = 1.0$ |
| $r_{12} =$ | −16.242 | $d_{12} = 0.9$ | $n_{12} = 1.62374$ $\nu_{12} = 47.1$ |
| $r_{13} =$ | −35.945 | $d_{13} = l_3$ | $n_{13} = 1.80518$ $\nu_{13} = 25.4$ |
| $r_{14} =$ | Diaphragm | $d_{14} = 1.68$ | $n_{14} = 1.0$ |
| $r_{15} =$ | 17.896 | $d_{15} = 3.85$ | $n_{15} = 1.0$ |
| $r_{16} =$ | 176.591 | $d_{16} = 3.22$ | $n_{16} = 1.834$ $\nu_{16} = 37.2$ |
| $r_{17} =$ | −23.005 | $d_{17} = 3.01$ | $n_{17} = 1.0$ |
| $r_{18} =$ | 74.537 | $d_{18} = 3.08$ | $n_{18} = 1.92286$ $\nu_{18} = 20.9$ |
| $r_{19} =$ | 100.572 | $d_{19} = 4.52$ | $n_{19} = 1.0$ |
| $r_{20} =$ | −19.100 | $d_{20} = 0.21$ | $n_{20} = 1.65844$ $\nu_{20} = 50.9$ |
| $r_{21} =$ | 18.186 | $d_{21} = 3.77$ | $n_{21} = 1.0$ |
| $r_{22} =$ | −58.998 | $d_{22} = 1.75$ | $n_{22} = 1.67000$ $\nu_{22} = 57.4$ |

-continued

| Focal length f = 9.228–43.805 F.No.1:1.26–1.45 | | | |
|---|---|---|---|
| $r_{23} =$ | −17.527 | $d_{23} = 0.8$ | $n_{23} = 1.0$ |
| $r_{24} =$ | −75.122 | | $n_{24} = 1.7552$ $\nu_{24} = 27.5$ |
| | | | $n_{25} = 1.0$ |

| | | | |
|---|---|---|---|
| f | 9.228 | 20.091 | 43.805 |
| $l_1$ | 1.495 | 14.229 | 20.085 |
| $l_2$ | 20.591 | 14.760 | 2.029 |
| $l_3$ | 14.215 | 7.313 | 14.187 |

6. A zoom lens as in claim 1, and having the following numerical data wherein the radius of curvature of the i-th lens surface is ri, the i-th axial separation between successive lens surfaces is di, the refractive index of the medium of the i-th lens is ni, the Abbe number of the medium of the i-th lens is $\nu$i, the i-th variable air separation is li, the focal lengths of the first, second, third, and fourth lens groups are $F_I$, $F_{II}$, $F_{III}$, and $F_{IV}$ respectively and i=1, 2, 3, ...

| Focal length f = 9.228–43.839 F.No.1:1.26–1.45 | | | |
|---|---|---|---|
| $r^1 =$ | 84.146 | $d_1 = 2.0$ | $n_1 = 1.0$ |
| $r^2 =$ | 35.583 | $d_2 = 7.87$ | $n_2 = 1.80518$ $\nu_2 = 25.4$ |
| $r^3 =$ | −103.996 | $d_3 = 1.0$ | $n_3 = 1.58913$ $\nu_3 = 61.1$ |
| $r^4 =$ | 27.917 | $d_4 = 4.07$ | $n_4 = 1.0$ |
| $r^5 =$ | 95.165 | $d_5 = l_1$ | $n_5 = 1.58913$ $\nu_5 = 61.1$ |
| $r^6 =$ | 363.049 | $d_6 = 0.9$ | $n_6 = 1.0$ |
| $r^7 =$ | 12.195 | $d_7 = 2.61$ | $n_7 = 1.69350$ $\nu_7 = 53.2$ |
| $r^8 =$ | −16.671 | $d_8 = 0.9$ | $n_8 = 1.0$ |
| $r^9 =$ | 13.785 | $d_9 = 2.79$ | $n_9 = 1.69350$ $\nu_9 = 53.2$ |
| $r^{10} =$ | −7680.848 | $d_{10} = l_2$ | $n_{10} = 1.80518$ $\nu_{10} = 25.4$ |
| $r^{11} =$ | 40.338 | $d_{11} = 5.19$ | $n_{11} = 1.0$ |
| $r^{12} =$ | −18.085 | $d_{12} = 0.9$ | $n_{12} = 1.62374$ $\nu_{12} = 47.1$ |
| $r^{13} =$ | −42.664 | $d_{13} = l_3$ | $n_{13} = 1.80518$ $\nu_{13} = 25.4$ |
| $r^{14} =$ | Diaphragm | $d_{14} = 1.68$ | $n_{14} = 1.0$ |
| $r^{15} =$ | 17.194 | $d_{15} = 3.77$ | $n_{15} = 1.0$ |
| $r^{16} =$ | 198.428 | $d_{16} = 3.27$ | $n_{16} = 1.7725$ $\nu_{16} = 49.6$ |
| $r^{17} =$ | −20.139 | $d_{17} = 3.01$ | $n_{17} = 1.0$ |
| $r^{18} =$ | 68.329 | $d_{18} = 3.11$ | $n_{18} = 1.80518$ $\nu_{18} = 25.4$ |
| $r^{19} =$ | 100.766 | $d_{19} = 4.56$ | $n_{19} = 1.0$ |
| $r^{20} =$ | −19.422 | $d_{20} = 0.21$ | $n_{20} = 1.65844$ $\nu_{20} = 50.9$ |
| $r^{21} =$ | 18.996 | $d_{21} = 3.68$ | $n_{21} = 1.0$ |
| $r^{22} =$ | −50.617 | $d_{22} = 1.81$ | $n_{22} = 1.7725$ $\nu_{22} = 49.6$ |
| $r^{23} =$ | −17.626 | $d_{23} = 0.8$ | $n_{23} = 1.0$ |
| $r^{24} =$ | −181.929 | | $n_{24} = 1.84666$ $\nu_{24} = 23.9$ |
| | | | $n_{25} = 1.0$ |

| | | | |
|---|---|---|---|
| f | 9.228 | 20.111 | 43.839 |
| $l_1$ | 1.495 | 14.240 | 20.089 |
| $l_2$ | 20.976 | 15.134 | 2.396 |
| $l_3$ | 7.32 | 7.32 | 7.32 |

* * * * *